(12) United States Patent
Nguyen

(10) Patent No.: US 8,106,747 B2
(45) Date of Patent: Jan. 31, 2012

(54) VEHICLE SECURITY SYSTEMS AND METHODS INCLUDING RFID ENABLED COMPUTER WITH OCCUPANT IDENTIFICATION AND SAFETY SYSTEM

(76) Inventor: Hap Nguyen, Westminster, CA (US)

( * ) Notice: Subject to any disclaimer, the term of this patent is extended or adjusted under 35 U.S.C. 154(b) by 360 days.

(21) Appl. No.: 12/315,193

(22) Filed: Nov. 28, 2008

(65) Prior Publication Data

US 2009/0267757 A1    Oct. 29, 2009

Related U.S. Application Data

(62) Division of application No. 11/212,469, filed on Aug. 25, 2005, now Pat. No. 7,573,373.

(60) Provisional application No. 60/695,707, filed on Jun. 30, 2005, provisional application No. 60/604,734, filed on Aug. 25, 2004.

(51) Int. Cl.
*H04Q 5/22* (2006.01)
(52) U.S. Cl. .................................. 340/10.1; 340/572.1
(58) Field of Classification Search ............... 340/572.1, 340/572.2, 426.1, 426.11, 426.13, 426.17, 340/539.1, 539.11, 539.15; 180/287
See application file for complete search history.

(56) References Cited

U.S. PATENT DOCUMENTS

| | | | |
|---|---|---|---|
| 4,660,528 A | 4/1987 | Buck | |
| 4,990,890 A | 2/1991 | Newby | |
| 5,819,198 A | 10/1998 | Peretz | |
| 5,861,799 A | 1/1999 | Szwed | |
| 5,933,075 A | 8/1999 | Ditson | |
| 5,949,340 A | 9/1999 | Rossi | |
| 5,952,941 A | 9/1999 | Mardirossian | |
| 6,025,784 A * | 2/2000 | Mish | 340/693.5 |
| 6,104,293 A | 8/2000 | Rossi | |
| 6,166,658 A | 12/2000 | Testa | |
| 6,167,333 A | 12/2000 | Gehlot | |
| 6,232,884 B1 | 5/2001 | Gabbard | |
| 6,664,888 B1 | 12/2003 | Bishop | |
| 6,707,391 B1 | 3/2004 | Monroe | |
| 6,771,168 B1 | 8/2004 | Nguyen | |
| 6,812,844 B1 | 11/2004 | Burgess | |
| 6,847,302 B2 | 1/2005 | Flanagan et al. | |
| 6,864,784 B1 | 3/2005 | Loeb | |
| 6,868,313 B2 | 3/2005 | Koljonen | |
| 6,876,296 B2 * | 4/2005 | Talmadge et al. | 340/10.42 |
| 6,897,762 B2 | 5/2005 | Howells | |
| 6,898,489 B1 | 5/2005 | Hayes, Sr. | |
| 6,998,956 B2 * | 2/2006 | Dix | 340/5.2 |
| 7,009,522 B2 | 3/2006 | Flanagan et al. | |
| 7,049,709 B2 | 5/2006 | Boggs | |
| 7,081,833 B2 | 7/2006 | Jo | |

(Continued)

FOREIGN PATENT DOCUMENTS

GB    2 290 109 A    12/1995

(Continued)

*Primary Examiner* — Shirley Lu
(74) *Attorney, Agent, or Firm* — Donald Bollella

(57) ABSTRACT

Vehicle occupant identification and safety systems and methods include an RFID equipped vehicle having a computer system for controlling operating functions of the vehicle, an RFID emitter for use by a passenger of the vehicle, and processing logic associated with the computer system for determining when a vehicle operator has discontinued vehicle operation and for detecting a signal from the passenger RFID emitter so that the computer system may be activated to send a distress signal when the passenger has remained in the vehicle after a predetermined time from when the operator discontinued operation of the vehicle.

20 Claims, 13 Drawing Sheets

U.S. PATENT DOCUMENTS

| | | |
|---|---|---|
| 7,230,530 B1 | 6/2007 | Almquist |
| 7,321,306 B2 | 1/2008 | Lee et al. |
| 7,348,880 B2 | 3/2008 | Hules et al. |
| 7,356,394 B2 * | 4/2008 | Burgess .......................... 701/33 |
| 7,369,936 B2 * | 5/2008 | Flick ............................ 701/113 |
| 7,403,845 B2 | 7/2008 | Patterson et al. |
| 7,489,247 B2 | 2/2009 | Lee et al. |
| 2006/0155430 A1 | 7/2006 | Burgess |
| 2009/0108989 A1 * | 4/2009 | Sinclair ........................ 340/5.62 |

FOREIGN PATENT DOCUMENTS

| | | |
|---|---|---|
| GB | 2 381 361 A | 4/2003 |

* cited by examiner

VEHICLE SECURITY SYSTEMS AND METHODS INCLUDING RFID ENABLED COMPUTER WITH OCCUPANT IDENTIFICATION AND SAFETY SYSTEM

CROSS-REFERENCE TO RELATED APPLICATIONS

The present application is a divisional of U.S. patent application Ser. No. 11/212,469 filed Aug. 25, 2005, now U.S. Pat. No. 7,573,373, which claimed the benefit of priority from U.S. Provisional Application Ser. No. 60/695,707 filed Jun. 30, 2005 and U.S. Provisional Application Ser. No. 60/604,734 filed Aug. 25, 2004 all of which are herein incorporated by reference in their respective entireties.

BACKGROUND OF THE INVENTION

1. Field of the Invention

This invention relates in general to RFID systems and, in particular, to RFID equipped vehicles. More specifically, but without restriction to the particular embodiments hereinafter described in accordance with the best mode of practice, this invention relates to vehicle immobilizer systems and methods including RFID enabled computers and associated license plates with RFID tags.

2. General Discussion and Related Art

There are devices currently available on the market that disable a vehicle during a high speed pursuit. One such method employs a brute force approach using high voltage or microwave energy to practically destroy a vehicle's computer and wiring system. Once this method is applied to the automobile's electrical system, it is virtually impossible and prohibitively expensive to restore the automobile back to an operational condition.

As RFID key evolution matures, wide scale adoption will progress in a manner similar to that of anti-lock braking, air bags, and other systems that have become standard features in the modern motor vehicles of today. It is anticipated that RFID technology will also become widely accepted over the next several years thus becoming a standard feature in motor vehicles of the future. The inventor hereof, however, believes that since car thieves will then no longer be able to hot wire newer vehicles from a parked condition in the absence of the driver, there will therefore be more incidents of car-jacking with vehicle owners or drivers taken hostage. Thus the present invention proposes various embodiments of anti-carjacking apparatus, systems, and methods for the avoidance of hi-speed pursuits which also provide for the preservation of occupant safety.

OBJECTS AND SUMMARY OF THE INVENTION

It is, therefore, an object of the present invention to improve upon prior art anti-theft systems and methods for automobiles.

Another object of this invention is to avoid high-speed pursuits.

It is a further object of the present invention to prevent hostage taking during a carjacking.

Still another object of the present invention is to reduce car theft.

And yet another object of this invention is to provide occupant safety systems for means of passenger transportation including automobiles.

Yet still a further object of this invention is to enable a vehicle to determine when a passenger has been located within the vehicle for too long of a period after discontinued operation thereof.

Another object of this invention is to utilize an embedded RFID tag in a license plate to disable operation of a vehicle when the license place is removed from the vehicle.

These and other objects are attained in accordance with the present invention wherein there is provided an anti-carjacking system including a transmitter programmed to receive a selected vehicle identification number (VIN) for use with a car assigned with that particular vehicle identification number; a receiver associated with the computer system of the car so identified by the selected vehicle identification number; means for disabling normal driving operation of the car; and means for sending a disable command from the transmitter to the receiver so that the particular car with selected vehicle identification number is rendered non-operational.

In accordance with one aspect of this invention, the car includes a fuel pump and the means for disabling normal driving operation of the car includes interrupting the flow of fuel from the fuel pump to the car's engine.

According to another aspect of the present invention the car includes a radio and the transmitter sends the disable command by radio transmission.

In brief, the present invention may preferably include the following technical and operational aspects: (1) a working range is 5 to 10 feet; (2) a programmable memory map; (3) in one particularly preferred embodiment, ten allocated memory addresses are assigned to allow multiple members of a family or company to properly and safely operate the same vehicle; (4) a designated address being reserved for shut down mode using VIN code or an universal code; (5) a multiple address group for high value cargo such as, for example, infants, children, or high price instruments; and (6) license plate theft prevention requires a memory address of its own.

More specifically, the present invention is also directed to a vehicle occupant identification and safety system. One particular embodiment of this system may advantageously include an RFID equipped vehicle including a computer system for controlling operating functions of the vehicle; an RFID emitter for use by a passenger of the vehicle, the RFID emitter in communication with the vehicle computer system when the passenger is in the vehicle; and processing logic associated with the computer system for determining when the vehicle has concluded operation and for detecting a signal from the passenger RFID emitter so that the computer system may be activated to send a distress signal when the passenger has remained in the vehicle after a predetermined time from when the vehicle has discontinued operation.

According to another aspect of the present invention there is provided a vehicle identification and immobilizer system. In a particular preferred embodiment thereof, this system includes an RFID equipped vehicle including a computer system for controlling operating functions of the vehicle; an RFID tag associated with a license plate of the vehicle, the license plate for display in a pre-determined location on the vehicle; an RFID reader positioned proximate the pre-determined location for the display of the license plate, the RFID reader being linked to the computer system and in communication with the RFID tag in the license plate when displayed in the pre-determined location on the vehicle; and processing logic associated with the computer system for determining when the license plate has been removed from the pre-determined location so that the computer system may be activated to send a disable signal to at least one of the operating functions of the vehicle.

In accordance with certain implementations of certain aspects of this invention, there is also provided a method for vehicle occupant identification and safety. In a particular embodiment thereof, this method may advantageously include the steps of providing an RFID equipped vehicle including a computer system for controlling operating functions of the vehicle; providing an RFID emitter for use by a passenger of the vehicle, the RFID emitter in communication with the vehicle computer system when the passenger is in the vehicle; and providing processing logic associated with the computer system for determining when the vehicle has concluded operation and for detecting a signal from the passenger RFID emitter so that the computer system may be activated to send a distress signal when the passenger has remained in the vehicle after a predetermined time from when the vehicle has discontinued operation.

BRIEF DESCRIPTION OF THE DRAWING

Further objects of the present invention together with additional features contributing thereto and advantages accruing therefrom will be apparent from the following description of certain preferred embodiments of the invention which are shown in the accompanying drawing with like reference numerals indicating like components or like method steps throughout, wherein.

DETAILED DESCRIPTION OF THE PREFERRED EMBODIMENTS

Figure 1:
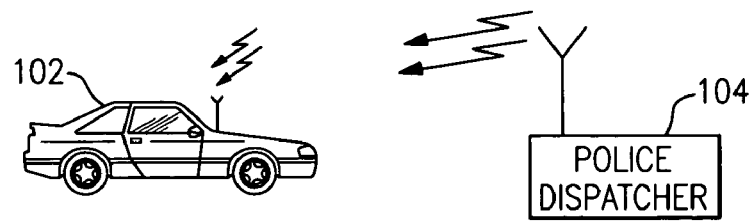
FIG. 1 is a pictorial schematic view of a system according to the present invention involving police dispatched shut-down of a vehicle from a fixed location.

With reference now to FIG. 1, there is shown a schematic view of one embodiment of a system according to the present invention involving police dispatched shut-down of a vehicle from a fixed location. This system includes an automobile, vehicle, car, or other motor vehicle 102 equipped with on-board RFID components of the present invention which are co-operatively integrated with corresponding system components permanently housed in a fixed location such as, for example, a police station, sub-station, or unmanned building structure or radio station identified in FIG. 1 as Police Dispatcher block 104. The functionality of the police dispatcher may also readily be implemented in a satellite or system of satellites in orbit around the earth. Generally, according to one method of the present invention, the police dispatcher 104 sends a signal to the car 102 which, in turn, is thereby disabled. Law enforcement officials approach the vehicle during pursuit then use a transmitter to send a "disable command" to automatically and safely disable the vehicle. The disable command may be transmitted from a fixed location such as a police station 104, from a satellite 106 (FIG. 2), or from a hand-held device or unit 108 as illustrated in FIG. 4.

Figure 4:
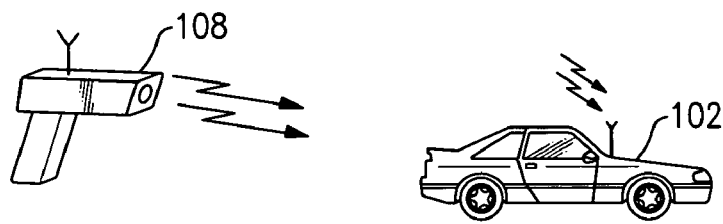
FIG. 4 is a pictorial schematic view of a system involving police dispatched shut-down of a vehicle by use of a hand-held transmitter device according to another aspect of the present invention.
Figure 2:
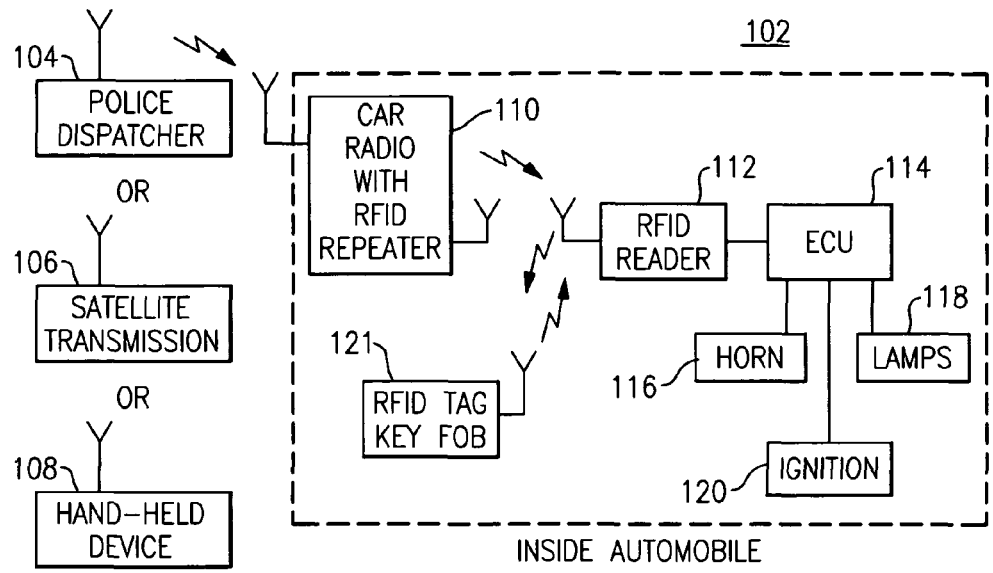
FIG. 2 is a block diagram of some of the principal components associated with the vehicle of FIG. 1 according to the present invention.

With particular reference now to FIG. 2, there is shown a block diagram of some of the principal components associated with the vehicle of FIGS. 1 and 4. In accordance with one aspect of the present invention, the vehicle 102 is provided with a car radio 110 having an RFID repeater. The car radio 110 is implemented to operatively cooperate with the vehicle's RFID system. As illustrated in FIG. 2, the vehicle's RFID system includes an RFID reader 112, an engine control unit or ECU 114 which is electronically engaged with the vehicle's horn 116, lamps or lights 118, and the vehicle's ignition system 120 hereinafter referred to as ignition, ignition coil, or ignition system 120. In the case of a properly encoded signal from the police dispatcher 104, or the satellite 106, or the hand-held device 108, the car radio 110 receives the signal accordingly and further transmits an appropriate signal to the RFID reader 112. The ECU is thereby notified, and software in the ECU 114 then disables the vehicle according to one of many pre-determined disable protocols. FIG. 2 also includes a RFID Tag which is typically housed in the vehicles key fob. This is illustrated by block 121 hereinafter referred to as RFID tag 121 or key fob 121. As understood by one of skill in the art of this industry, when the ignition key is inserted into the steering column or key hole, the key fob 121 emits a signal to the RFID reader 112. In this manner, only a person with the proper key may start the car. Currently there are offered different types of keys with this capability. They may include 40 bit, 48 bit, 60 bit, or 128 bit codes which employ encryption as understood by those of skill in the art.

Thus according to the invention, in the case of a witnessed car-jacking, the witness may call 911, providing police dispatchers with the vehicle's license plate number. The police dispatcher may then broadcast the shutdown code to disable the vehicle. In accordance with another aspect of this invention, the police dispatcher may also activate the Global Position System (GPS), as appropriately implemented in a vehicle, to determine the location of the vehicle and to send help as needed.

As represented in FIG. 2, the police dispatcher 104, satellite 106, or hand-held device 108 sends out a radio signal. This signal may contain standard radio broadcast information and a carrier signal operable and compatible with the modified car radio system as described. In this manner, if the subject vehicle is identified as a stolen car, for example, the base station may broadcast a signal which will disable the subject vehicle from further operation. The inventor hereof envisions that all automobiles sold in the U.S., for example, be required to have as standard safety equipment the system of the present invention. Further in combination therewith, a nation wide network of enabled radio sub-stations is proposed. In this manner, local, state, or federal government agencies are envisioned as the operations of the system to locate and disable all stolen cars nation wide. With such a system deployed and maintained, auto theft may become a thing of the past.

Figure 3:
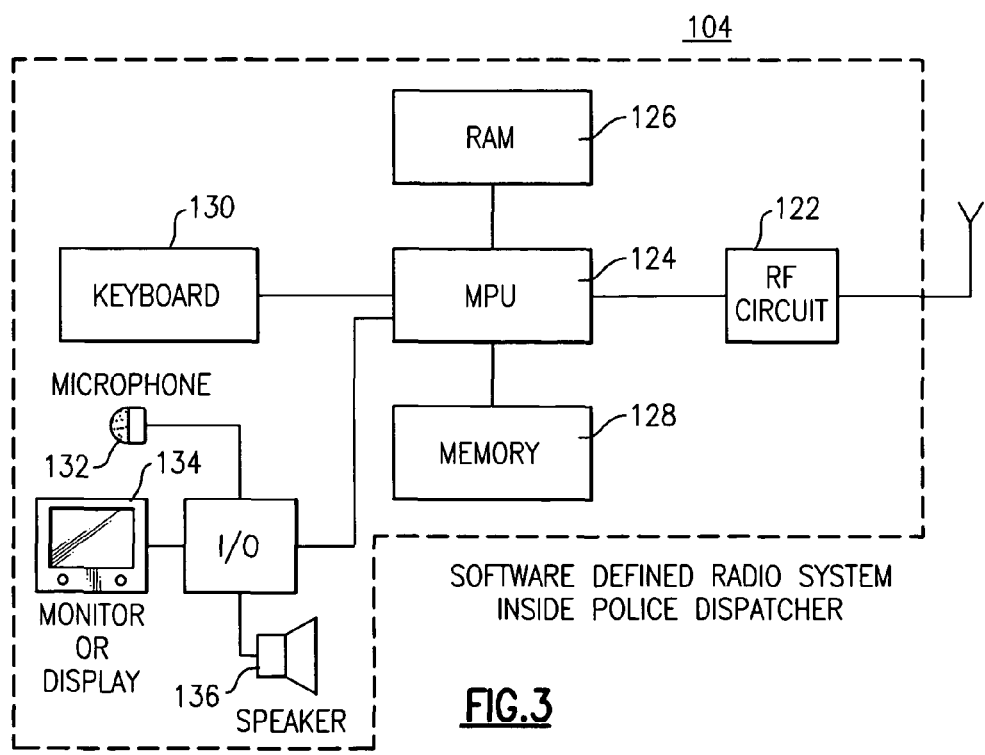
FIG. 3 is a block diagram showing some of the principal components of the radio system of this invention as implemented in association with the police dispatcher location of FIG. 1.

With reference next to FIG. 3, there is shown a block diagram illustrating some of the principal components of the police radio system of this invention as implemented in association with the police dispatcher location 104 of FIG. 1. The police radio system as implemented in the police dispatcher 104 according to the present invention is preferably a software defined radio system which is programmable to receive and transmit various signals which may be encoded, encrypted, or otherwise rendered proprietary or protected as would be understood by one of skill in the art. The radio system illustrated in FIG. 3 thus includes RF circuitry 122 with an antenna, a micro-processor unit or MPU 124, random access memory or RAM 126, storage memory 128, a keyboard 130, and other input/output devices which may include a microphone 132, a monitor or display 134, and a speaker or speakers 136. In accordance with this aspect of the present invention, the memory 128 of the police radio system includes a listing of vehicle identification numbers (VIN). As generally understood, the VIN is a seventeen alpha numeric sequence in the format "12,345,679,0AB,CDE,XYX". Thus in this manner, in the event a particular car is stolen, the police dispatcher may quickly program the police radio system to broadcast a signal that is received by the car radio 110, FIG. 2, which in turn will promptly disable operation of the car. As would be readily understood in view of the present disclosure, this system is not necessarily limited to the use of VIN. License plate numbers, for example, or other serial numbers or codes may be easily adopted and implemented in the alternative.

One preferred use of the present invention involves hot-pursuit by the police of either a stolen car or criminals attempting to flee the police by motor vehicle. As the police are in hot pursuit, all they need to do in order to safely apprehend the occupants is to radio the dispatcher and provide the license plate number of the vehicle under pursuit. The dispatcher then, in turn, broadcasts a disable signal and the vehicle under hot pursuit comes to a slow, harmless stop. As will be described below in further detail, this is achieved by the present invention without any damage to the vehicle. Furthermore, widespread adoption and use of the present invention will reduce or eliminate the now all-to-frequent innocent by-stander tragedies that often result from police hot pursuits.

As an alternative or compliment to the fixed location dispatched systems discussed above, the present invention also provides a mobile embodiment. With specific reference now to FIG. 4, there is shown a pictorial schematic view of this alternate system directed to police dispatched shut-down of the vehicle 102 by use of the hand-held transmitter device 108.

Figure 5:
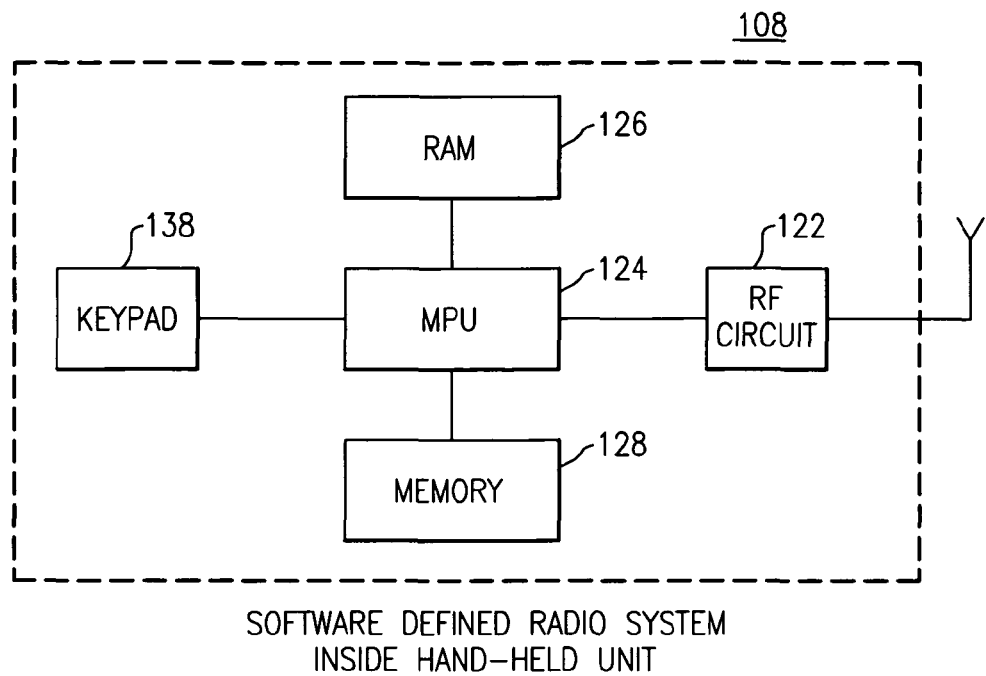
FIG. 5 is a block diagram of some of the principal components associated with the hand-held transmitter device of FIG. 4.
Figure 6:
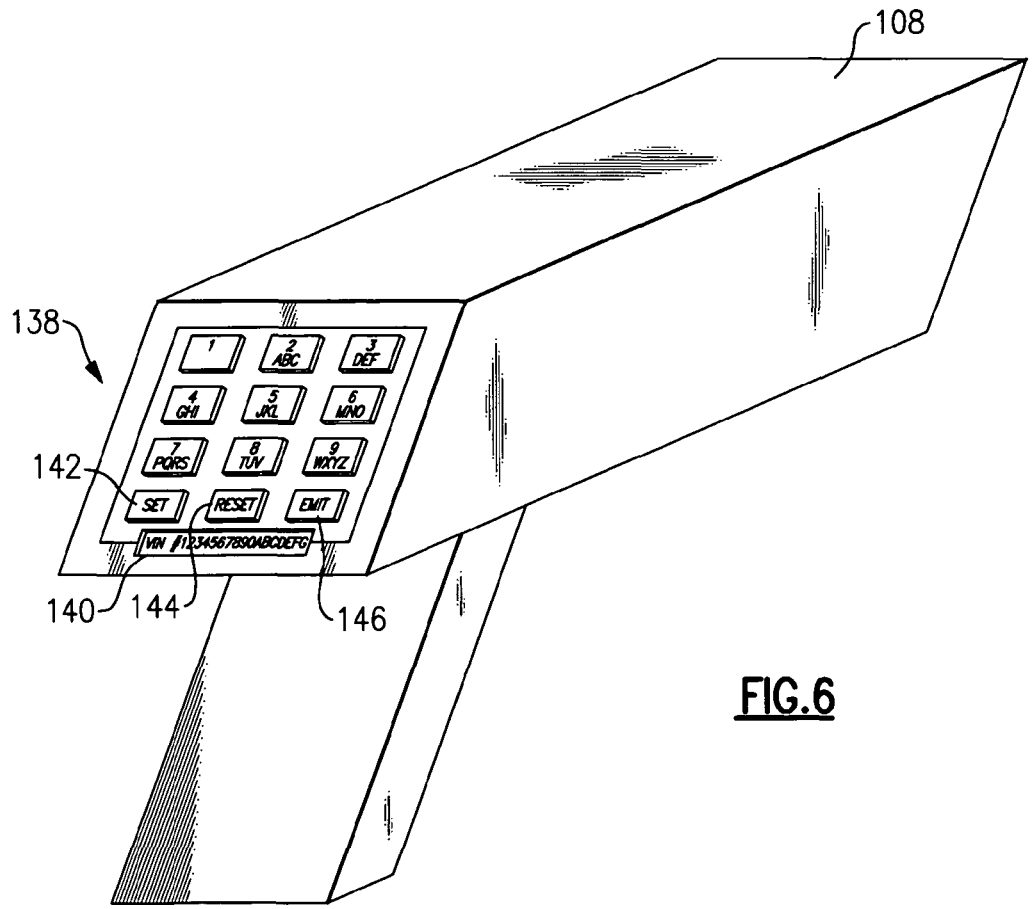
FIG. 6 is a perspective rear view of the hand-held transmitter device illustrated in FIGS. 4 and 5.

A block diagram of some of the principal components associated with the hand-held transmitter device 108 is shown in FIG. 5. As in the case of the police dispatcher software defined radio system shown in FIG. 3, the hand-held transmitter device 108 as shown in FIG. 5 includes the RF circuitry 122 with antenna, the micro-processor unit or MPU 124, the random access memory or RAM 126, and the storage memory 128. Rather than including a keyboard, the compact hand-held unit 108 is provided with a keypad 138 as illustrated in FIGS. 5 and 6. In this manner, both numbers and letters may be input into the device. The hand-held device 108 may advantageously include an output display 140. In the preferred embodiment illustrated in FIG. 6, the device 108 includes a set key 142, a reset key 144, and an emit key 146. As one example of inputting both numbers and letters from the keypad, one press of the "2" key may be assigned to the number 2, two presses of the "2" key may be assigned to the letter "A", three presses of the "2" key may be assigned to the letter "B", and four presses of the "2" key may be assigned to the letter "C".

In use of the device 108, a police officer or other authorized official inputs via the keypad 140 the vehicle's VIN, license plate number, or other ID code. The set key 142 may then be pressed so that the input is properly registered with the device. As illustrated in FIG. 4, the device 108 is then pointed at the vehicle in question and with activation of the emit key 146, a prescribed disable signal is directed from the device 108 to the vehicle 102. Depending on the power and range of the device 108, the signal may be detected by either the car radio with RFID repeater 110, FIG. 2, or alternatively directly by the RFID reader 112 also illustrated in FIG. 2.

Figure 7:
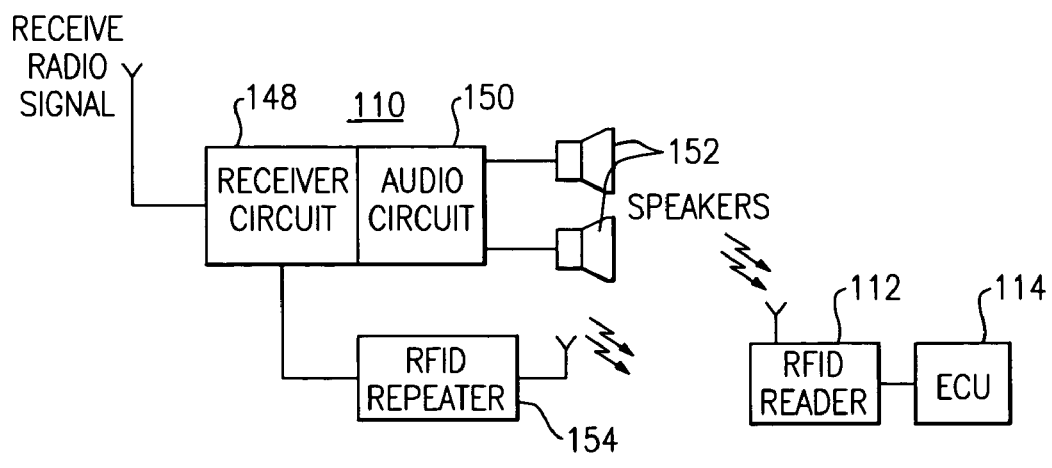
FIG. 7 is a general system block diagram of a car radio according to the present invention as cooperatively integrated with a vehicle's RF identification system to achieve vehicular disablement according to a principal aspect of this invention.

In FIG. 7, there is shown a general system block diagram of the car radio 110 as cooperatively integrated with the vehicle's RF identification system to achieve vehicular disablement according to one of the principal aspects of this invention. As illustrated, the car radio 110 includes a receiver circuit 148, an audio circuit 150, speakers 152, and an RFID repeater 154. As illustrated, the RFID repeater 154 transmits its signal to the RFID reader 112 in the vehicle's RFID system.

Figure 8:
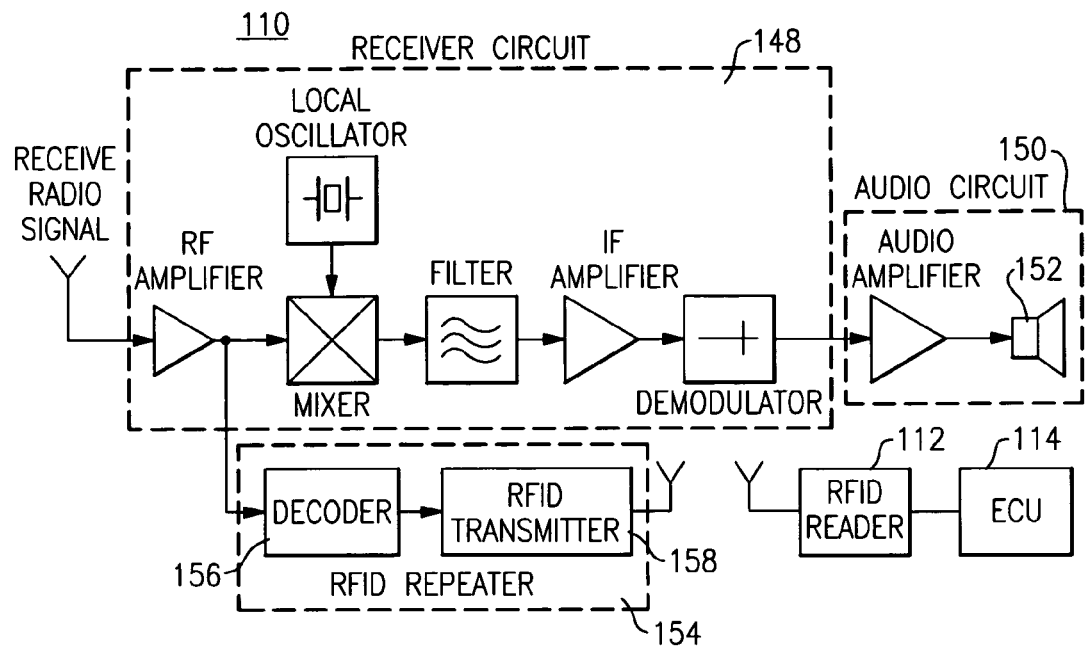
FIG. 8 is a detailed block diagram of the modified car radio according to the present invention.

Referring now specifically to FIG. 8, there is shown a detailed block diagram of the modified car radio 110 including the receiver circuit 148, the audio circuit 150, and the RFID repeater 154 which is wirelessly engaged with the vehicle's RFID reader 112 and the ECU 114 as shown. As further illustrated in FIG. 8, the RFID repeater 154 includes a decoder 156 and an RFID transmitter 154. As would be readily understood by one of skill in the art, a radio signal is received by the radio antenna, directed to the RF amplifier, and then further processed by the local oscillator, mixer, filter, intermediate frequency (IF) amplifier, demodulator, and audio amplifier to produce sound at the speaker output 152. In accordance with teachings of the present invention, the RFID repeater 154 including the decoder 156 and the RFID transmitter 154 is connected as shown to the receiver circuit 148 between the RF amplifier and the mixer. In this manner, when an appropriate disable signal is transmitter from either the police dispatcher 104, the satellite 106, or the hand-held device 108, (FIG. 2), the disable signal is received by the antenna of the receiver circuit 148, amplified by the RF amplifier, directed to the RFID repeater 154 where it is decoded by the decoder 156 and then transmitted by the RFID transmitter 158 to the RFID reader 112, and then directed to the ECU 114 to thereby disable the vehicle accordingly.

Figure 9A:
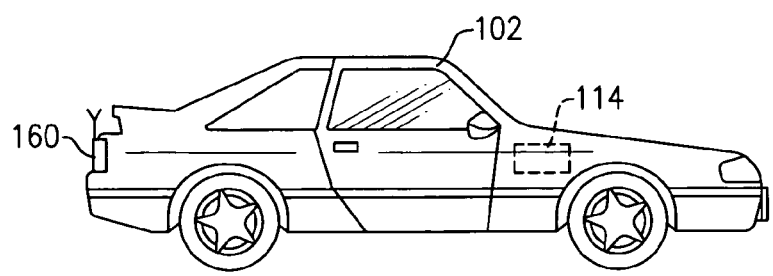
FIG. 9A is a side elevation view of an automobile showing in phantom line the vehicle's computer and an RFID embedded license plate according to another aspect of the present invention.
Figure 9B:
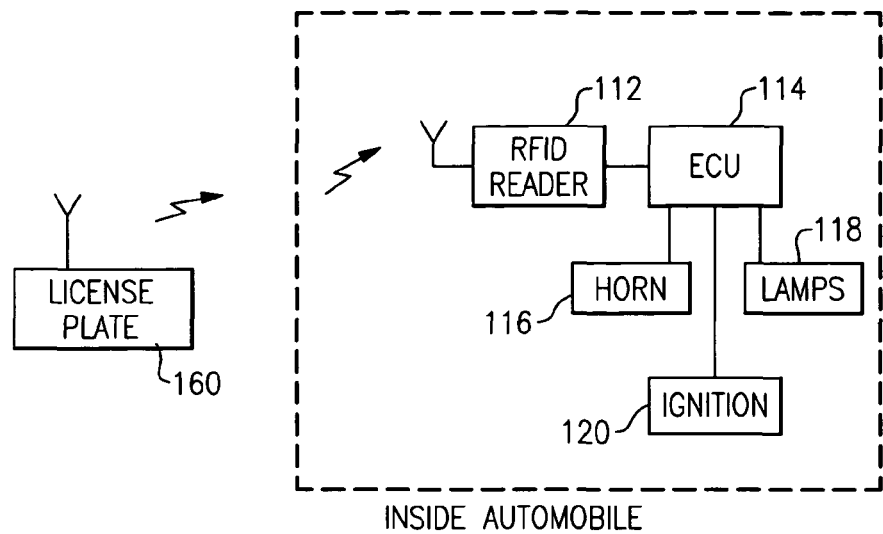
FIG. 9B is a block diagram depicting the license plate of the present invention cooperatively interacting with the RFID reader and engine control unit of an RFID equipped vehicle.

With reference now to FIG. 9A, there is illustrated a side elevation view of the automobile 102 showing in phantom line the vehicle's computer or ECU 114 and an RFID embedded license plate 160 according to another aspect of the present invention. The RFID embedded license plate 160 is preferably only employed on the rear of the vehicle 102. In this embodiment, the license plate of the car has an imbedded RFID system which is enabled to work in conjunction with the vehicle's computer. Thus according to this aspect of the invention, if the car is stolen and there is an attempt to change the license plate of the car, the car will become non-operative because the RFID transmitter embedded in the license plate is missing from the read zone of the vehicle's RFID reader. Thus any attempt to switch plates for criminal purposes will be prevented by this aspect of the present invention:

More particularly now with reference to FIG. 9B, there is shown a block diagram including license plate 160 cooperatively interacting with the RFID reader 112 and engine control unit 114 of an RFID equipped vehicle. Thus in accordance with this aspect of the present invention, when the license plate 160 is removed from the read zone of the RFID reader 112, the ECU will detect the absence of the plate. This will in turn trigger one of various disable protocols which will then be executed by the ECU 114. Such protocols may include, for example, a "do-not-start" or "do-nothing" command if the vehicle is in a parked, non-moving condition when the license plate 160 is removed from the read zone of the RFID reader 112, or a "discontinue-fuel-flow" in the same case or if there is any attempt to remove the license plate 160 from the read zone of the RFID reader 112 when the vehicle is in motion. More commonly, other protocols may include "sound-horn" or "flash-lights" commands either executed individually, alternatively, or in combination with the "do-not-start" or "discontinue-fuel-flow" commands.

Figure 9C:
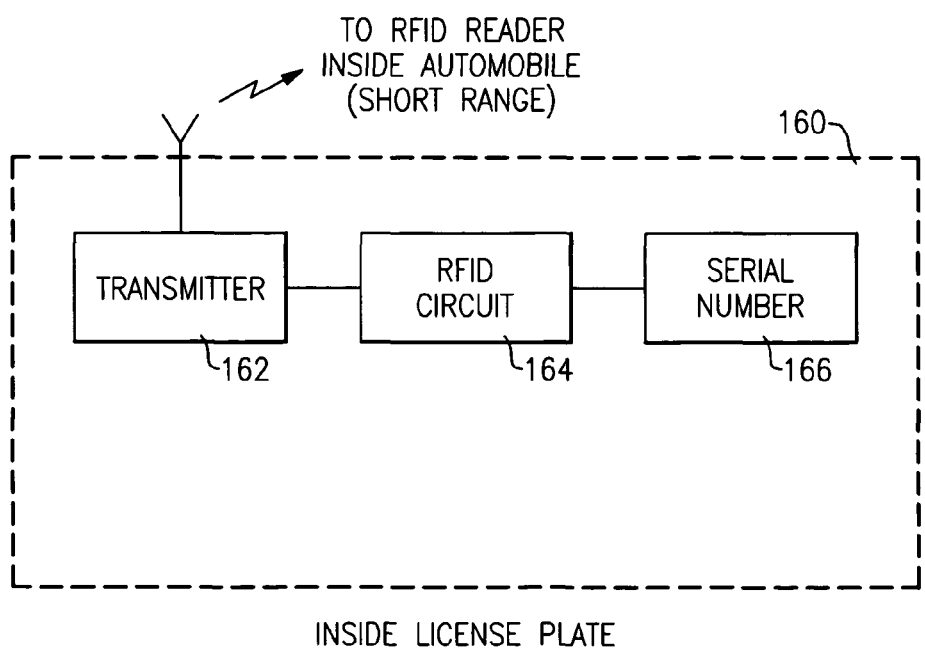
FIG. 9C is a block diagram illustrating the principal components of the RFID embedded license plate of the present invention.

FIG. 9C is a block diagram illustrating the principal components of the RFID embedded license plate 160 of the present invention. As illustrated, the license plate 160 includes a transmitter 162, an RFID circuit 164, and a serial number 166. The RFID circuit may include memory for storing the serial number 166, or the serial number may simply be hard wired or otherwise hard coded in the RFID circuit 164. As illustrated in FIGS. 9B and 9C, the distance between the license plate 160 and the RFID reader 112 is short range, preferably on the order of only a few inches or centimeters. In this manner, the plate 160 may not be removed from its proper location and otherwise placed in the car to thereby be concealed from authorities and still be within the read zone of the reader 112. Thus placement of the antenna of the RFID reader would preferably be within the car frame or trunk cavity located immediately adjacent the antenna of the license plate 160. As would be readily understood by one of skill in the art given the present disclosure, the serial number may include any convenient number such as the VIN, the actual number of the license plate, or any other code or number that for intended purposes uniquely associates the license plate with a specific vehicle.

Figure 10:
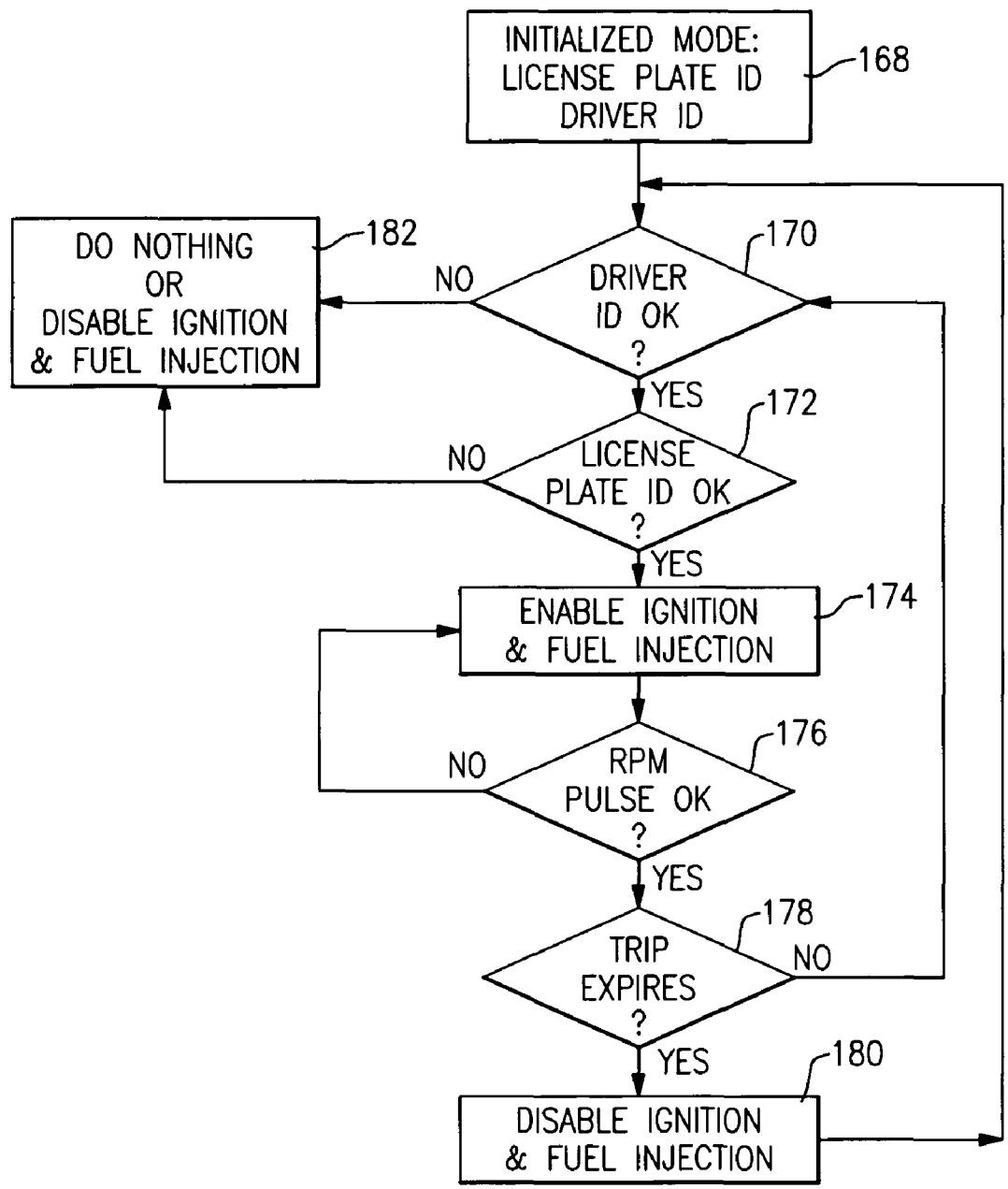
FIG. 10 is logic flow chart showing one of the various methods associated with the RFID embedded license plate according to the present invention.

Referring next to FIG. 10, there is shown a logic flow chart illustrating one of the various methods associated with the RFID embedded license plate 160 of the present invention. As illustrated, one such preferred method is initiated at step 168 where the ECU 114 is engaged to run a license plate ID and driver ID routine. At step 170, first the driver ID is checked. This check is based on the driver having the proper key fob 121, FIG. 2, associated with the vehicle. If the driver ID check is confirmed as OK, the routine will proceed to step 172, if not, then the routine will proceed to step 182 and the car will be prevented from starting when it is in a stopped condition or if in a moving condition, the ECU 114 will disable ignition by reducing fuel injection to a "no-flow" condition. At step 172, the license plate ID is checked. If the license plate check is negative or "no", the routine proceeds to step 182 and the "do-nothing" or "disable" commands are executed by the ECU. If the license plate check is positive, OK, or "yes", the routine proceeds to step 174 and the car is allowed to start. Once the car is then running, step 176 checks to determine whether RPM is generated. If the car is stopped with the engine turned on, the engine function remains enabled. When the car is stopped and the engine turned off, the "Trip Expires" step 178 disables the ignition function. If the trip has not expired, driver and license plate ID checks are repeated.

Figure 11:
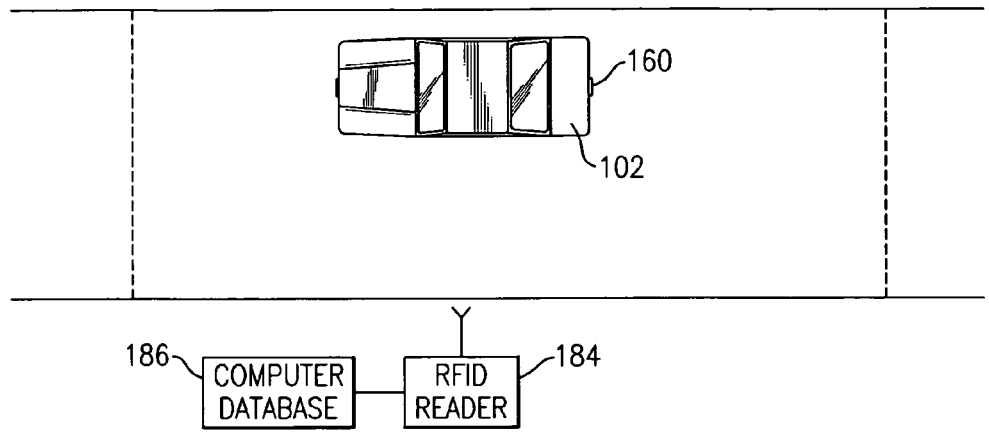
FIG. 11 is a top view of an automobile in a speed control zone or pay toll zone illustrating an interactive vehicle ID, authentication, and control system according to another principal aspect of the present invention.
Figure 12:
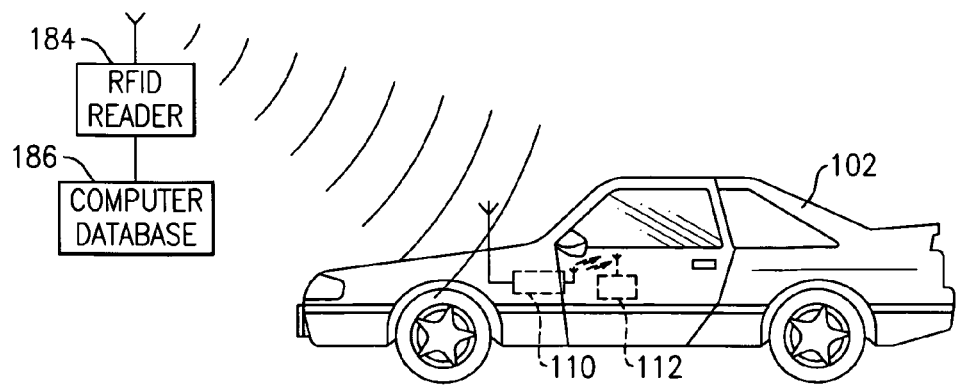
FIG. 12 is a side view pictorial diagram of the interactive vehicle ID, authentication, and control system of the present invention.

With reference now to FIGS. 11 and 12, there are shown a top and side views of an automobile 102 in a speed control zone or pay toll zone illustrating the interactive vehicle ID, authentication, and control system according to another principal aspect of the present invention. The system includes the car 102 as equipped with the invention hereof, and further includes a road side RFID reader 184 which is cooperatively connected to a computer or computer and computer database 186. As the car 102 proceeds through the zone, the license plate 160 and the key fob 121 are emitting their short range signals. The read zone created by the road side RFID reader 184 is large enough to cover the entire speed control or pay toll zone. Thus as the car passes through the zone, the road side reader 184 reads either one or both of the signals emitted by the license plate 160 and the key fob 121. The computer data base 186 includes a listing of valid VIN, license plate numbers, and any other types of codes that may be associated with the vehicle.

According to this aspect of the present invention, the license plate 160 has not been switched by a thief or highjacker who has stolen the car. In this situation, the car equipped with the RFID license plate is being driven through the "speed control zone" as illustrated in FIG. 11. The car's computer is advantageously programmed and equipped with speed control response capabilities as further described below with reference to FIG. 13. In this manner, when the car is driven through the zone, the road side RFID reader 184 reads the vehicle ID and operates to control the speed of the car or otherwise completely disable the car from operating. Many applications of this aspect of the present invention are envisioned by the inventor hereof. One such application, for example, is use of this system in controlled government areas such as military bases or diplomatic areas. Only cars with known IDs would be allowed to pass through the zone. In alternate embodiments of this system, the RFID transmitter need not necessarily be embedded in the license plate. Other configurations and locations of the transmitter/transponder and receiver system may be readily implemented according to the principal aspects of this invention.

Figure 13:
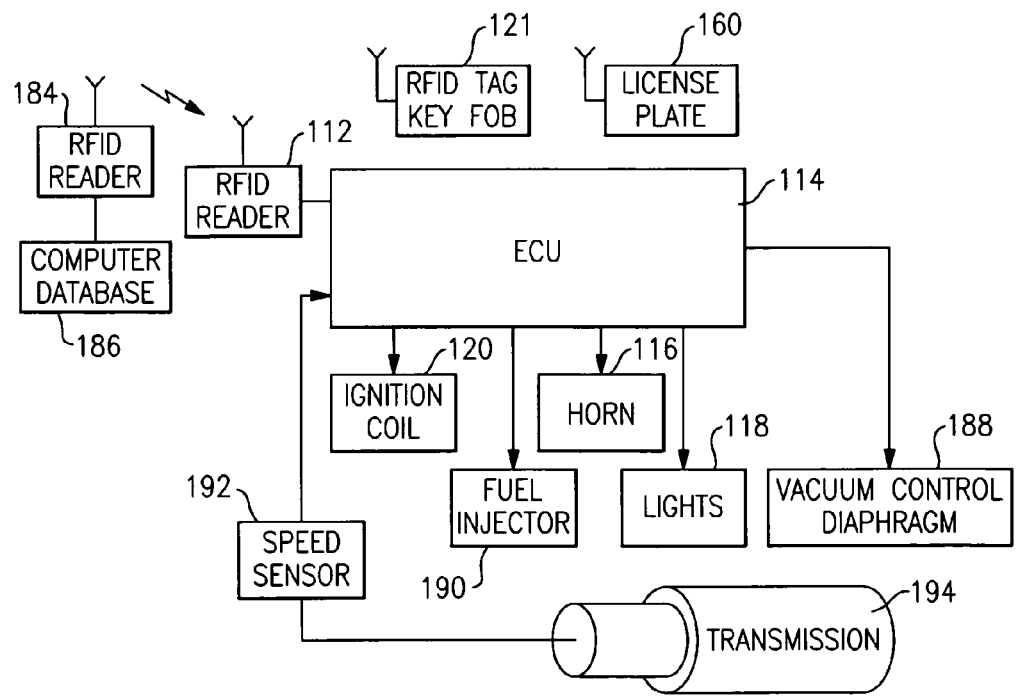
FIG. 13 is a block diagram of the principal components of the interactive vehicle ID, authentication, and control system of the present invention.

Referring now to FIG. 13, there is shown a block diagram of the principal components of the interactive vehicle ID, authentication, and control system of the present invention. Components thereof discussed above will not be initially repeated here for the sake of convenience. As illustrated, the ECU 114 is further engaged with a vacuum control diaphragm 188, a fuel injector 190, and a speed sensor 192 as associated with the vehicle's typical operational functions. The speed sensor 192 is connected between the ECU 114 and vehicle's transmission 194. In this manner, the ECU 114 (as programmed according to the various methods and protocols described herein) is enabled to control the speed of the car and over-ride the drivers direct control when one of various different control signals is sent from the road side RFID reader 184 to the vehicle's RFID reader 112. For example, the vehicle may be completely stopped by deactivating the ignition coil 120. In addition, the speed of the vehicle may be controlled by a signal sent from the road side RFID reader 184 to the vehicle's RFID reader 112 which commands the ECU 114 to reduce the fuel rate in the fuel injector 190, or the amount of vacuum via the vacuum control diaphragm 188. The speed sensor 192 will give continuous feed back to the ECU 114 thus allowing speed reduction or stopping to be controlled in a precise and predictable manner.

Figure 14A:
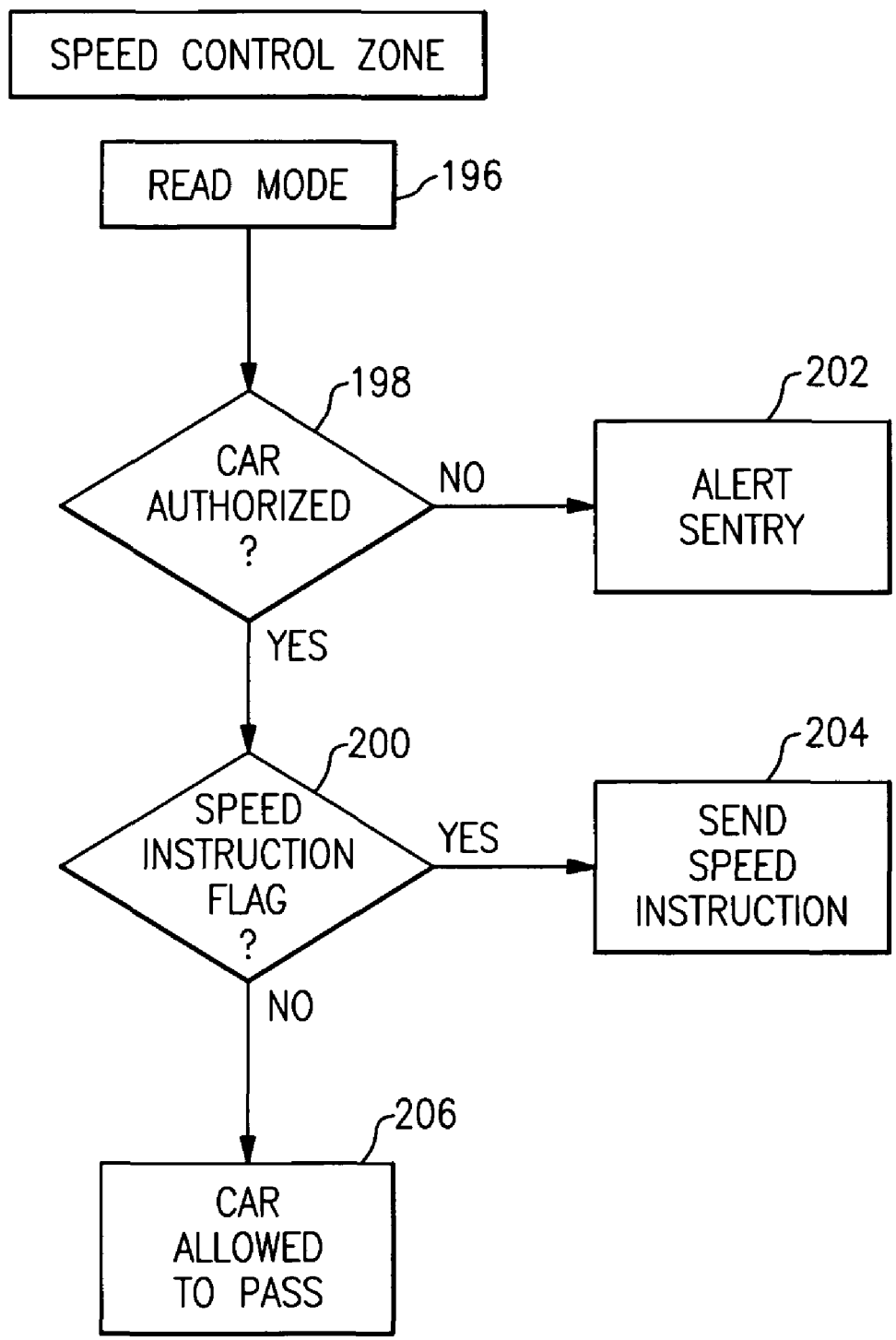
FIG. 14A is a logic flow chart showing one of the various preferred methods associated with the speed control zone aspect of the present invention.

FIG. 14A is a logic flow chart showing one of the various preferred methods associated with the speed control zone aspect of the present invention. In this method, a read mode 196 is initiated by the system. At step 198, authorization is checked. If the car is authorized, the routine proceeds to step 200 and if not, a sentry alert signal is sent from the computer 186. Authorization may simply include a check as to whether the car is properly registered, or has all fees associated with the driver's responsibility have been paid. This may include registration fees, parking fees, or traffic citation fees, or any other official or court ordered fees. According further to the speed control aspect of the invention, the step 200 inserts an instruction flag into the signal which is sent to the car's ECU. Such an instruction flag may be selected from the set including, for example, "A1=15 mph", "A2=25 mph", "A3=35 mph", "A4=45 mph", "A5=55 mph", "A6=65 mph", and "A7=75 mph". In this manner, step 204, "Send Speed Instruction" sends, for example the flag A3 in a 35 mile per hour zone to the vehicle. If the vehicle is exceeding 35 mph, the car's ECU automatically takes corrective action to bring the speed of the car within the requirement of the zone. In the last step 206, the car is allowed to pass without shut down if the required speed and or authorization have been achieved.

With continued reference now to FIGS. 13 and 14A, the vehicle's speed sensor 192 which is mounted on the output shaft of the transmission 194 sends electrical pulses to the computer or ECU 114, pulses which are generated by a magnet spinning past a sensor coil. When the vehicle's speed increases, the frequency of the pulses correspondingly increases. For any given speed of the vehicle there is a corresponding pulse frequency. It is this pulse frequency which the cruise control, for example, tries to maintain as a constant. The speed control part of the ECU 114 has three functions. First, it stores the speed control code of various speeds of the vehicle in the memory. When speed control flag (FIG. 14A) is received by the ECU 114, the system will check for a speed table and send instructions accordingly, step 204 of FIG. 14A. Second, it receives the pulses from the transmission sensor and compares the frequency of those pulses to the frequency value stored in its memory. This is defied as the "set point". Third, it sends pulses to a vacuum controlled diaphragm 188 connected to the accelerator linkage. The pulses it sends regulates the amount of vacuum the diaphragm receives. The more pulses, the more vacuum and the more vacuum the more force on the accelerator linkage. The system continues to add vacuum force until the set point speed is reached. At that point the system modulates the amount of vacuum the diaphragm receives in an effort to maintain the number of pulses coming from the speed sensor as close to the stored value as possible.

Figure 14B:
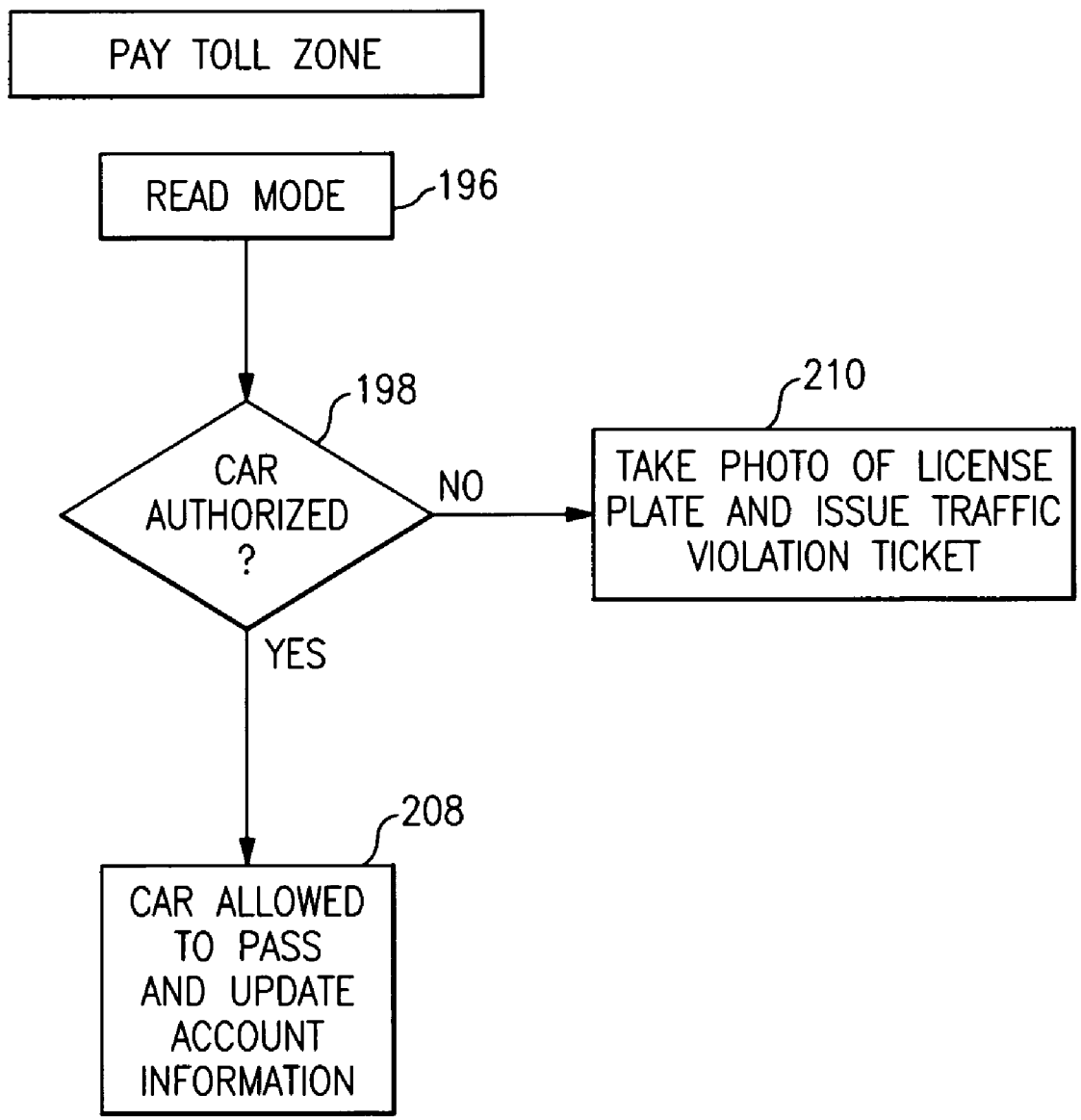
FIG. 14B is another logic flow chart illustrating one of the possible methods associated with the pay toll zone aspect of the present invention.

FIG. 14B is another logic flow chart illustrating one of the possible methods associated with the pay toll zone aspect of the present invention. This method is initiated by the read mode step 196. The car authorization step 198 is then performed on the vehicle as it passes through the automated toll booth according to the present system. Authorization in this embodiment may be preferably linked to maintaining a current account with the toll authority having a positive cash balance. If authorization is approved, the car is allowed to pass and the owner's account information is updated by deducting the amount of the toll from the then current balance. If the account is in default, or non-existent, then in step 210 a photo is taken of the license plate with time and date stamp, and a traffic violation citation or ticket is mail by the toll authority or police to the registered owner of the vehicle.

Figure 15:
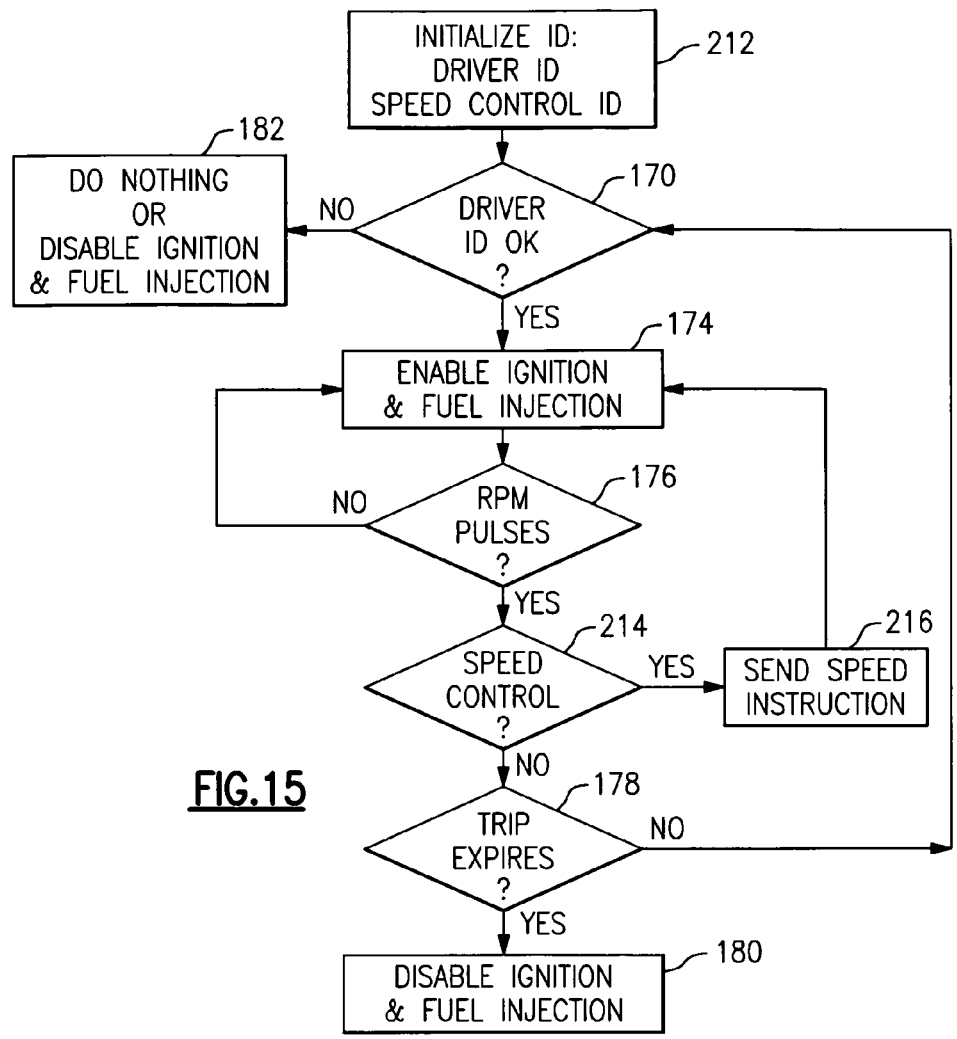
FIG. 15 is yet another logic flow chart showing a second one of the methods associated with the speed control zone aspect of the present invention.

With reference next to FIG. 15, there is presented yet another logic flow chart showing a second one of the methods associated with the speed control zone aspect of the present invention. In this method, a driver ID and speed control ID routine is initiated at step 212. Next at step 170, the driver ID check is performed. As discussed above, this check is based on the driver having the proper key fob 121, FIG. 2, associated with the vehicle. If the driver ID check is confirmed as OK, the routine will proceed to step 174, if not, then the routine will proceed to step 182 and the car will be prevented from starting when it is in a stopped condition or if in a moving condition, the ECU 114 will disable ignition by reducing fuel injection to a "no-flow" condition. At step 174, the engine ignition and fuel injection system are activated. Step 176 performs the RPM test as discussed above. The speed control step 214 then determines if the speed is too high as determined by the PRM test. If the speed is above a set limit, then the routine proceeds to step 216 where a speed instruction is sent to the ECU. In this method, step 214 may correspond to step 200 of the method discussed in connection with FIG. 14A and similarly, step 216 of FIG. 15 may correspond to step 204 in FIG. 14A. This method then concludes with the trip expires step 178 and disable step 180 as discussed above.

Figure 16:
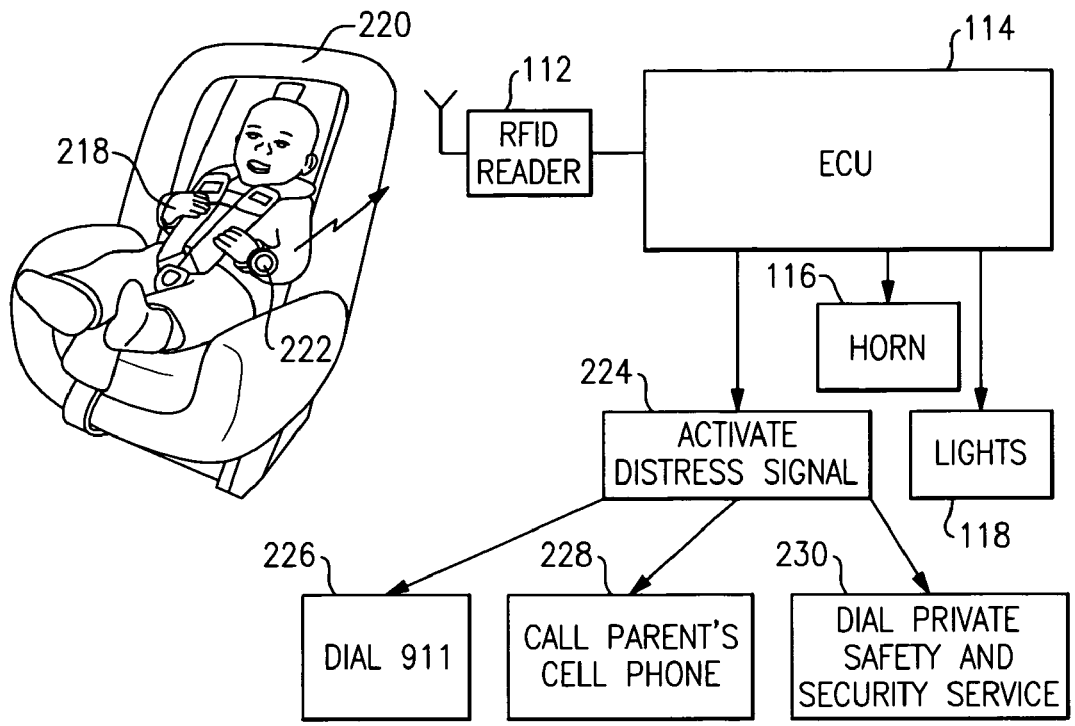
FIG. 16 is a pictorial and block diagram view of a child safety aspect according to still another aspect of the present invention.

Referring now to FIG. 16, there is shown a pictorial and block diagram of a child or occupant safety aspect according to still another aspect of the present invention. According to this aspect of the present invention, a child or other occupant 218 seated in a car seat 220 with a safety belt attached is provided with a personal RFID emitter device 222. In the case of a child, the personal RFID emitter 222 may be housed in a child's wrist watch or bracelet as illustrated. Several personal emitters may be supplied by the manufacture of the vehicle so that all members of an owner's family may be outfitted accordingly. The personal emitter 222 emits a continuous ID signal within the read zone of the RFID reader 112. The ECU is programmed to recognize the signal and initiate certain protocols when system parameters are in certain conditions and relationships. For example, if the child passenger has been in the car for a pre-determined amount of time without the car running, this many cause an alarm to sound. In this case, the ECU 114 may activate the horn 116 and or lights 118 to call to the attention of passers-by or others with range of the car. A protocol to activate a distress signal represented in block 224 may be initiated in cars equipped with telephone communications systems. Auto dial functions may then be initiated by the ECU 114. The activated signal may call 911 as in block 226, call the parent's cell phone as in block 228, or dial a private safety and security service as in block 230. Thus according to these aspects of the present invention, a child inadvertently left behind in a vehicle will soon have needed attention so as to avoid neglect and other tragedies such as heat exposure or suffocation.

According to another aspect associated with the personal RFID emitter device 222, an adult occupant may be outfitted with such a device that has disable command capability build-in, such as a panic button built-in to the device that is wearer activated. Thus in the event of a car jacking if vehicle's owner taken hostage, the small transmitter has a pre-programmed shutdown code either portable or fixed with multiple strategically mounted activation switches such as in the trunk, passenger seat, rear seat, or elsewhere which give the vehicle's owner or family member chances to trigger the shutdown mode and to send out distress signal.

Figure 17:
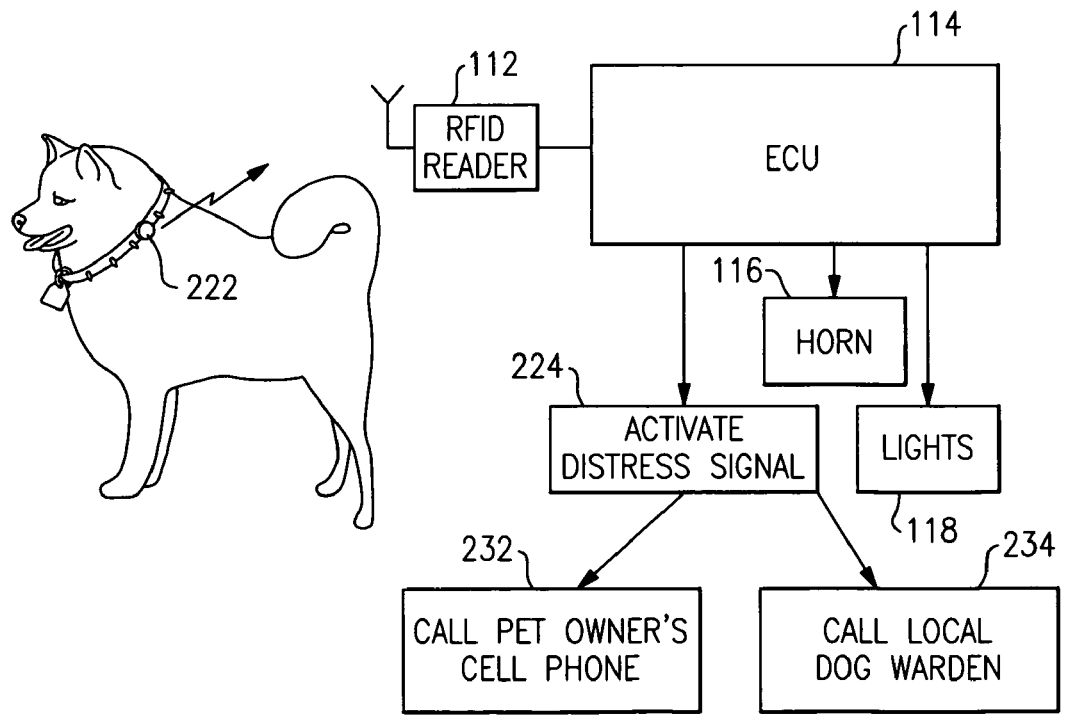
FIG. 17 is a pictorial and block diagram view similar to FIG. 16 illustrating an animal safety aspect according to yet a further aspect of the present invention.

FIG. 17 is a pictorial and block diagram view similar to FIG. 16 illustrating an animal safety aspect according to yet a further aspect of the present invention. Here, the personal RFID emitter device 222 is installed in a pet collar as illustrated by way of example. In this manner, the family pets may be protected against inadvertent periods of long duration in the car without needed attention. As with the child safety feature discussed above, if the pet has been left in the car for too long a time as determined from a continuous signal from the device 222 without vehicle operation, the ECU activates either the horn 116, lights 118, or a distress signal 224 which may include an automated telephone call to the pet's owner as represented in block 232 or the local dog warden or animal control authorities as shown in block 234.

Figure 18:
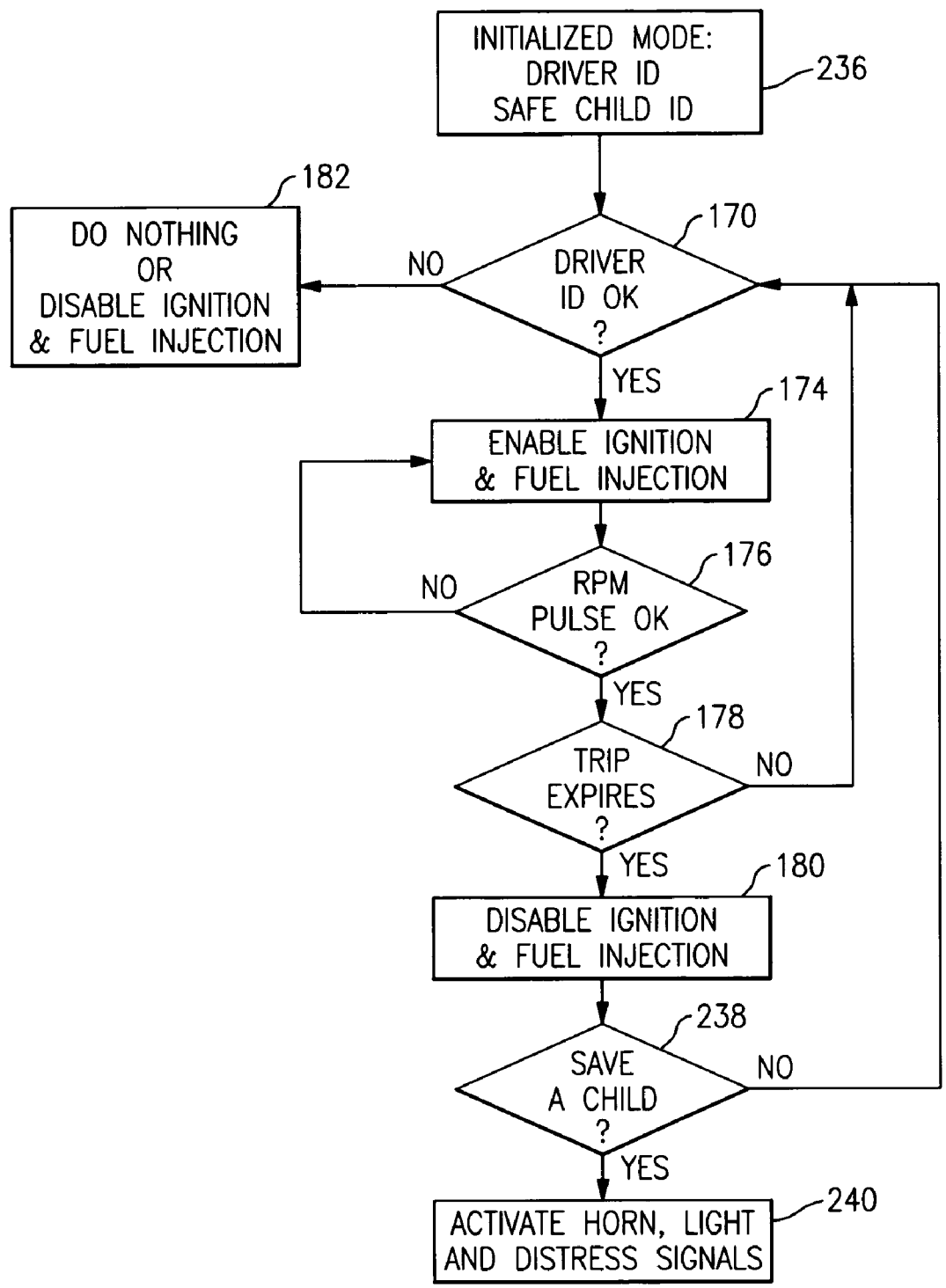
FIG. 18 is a logic flow chart showing one of the methods associated with the occupant safety aspects of the present invention.

With reference next to FIG. 18, there is presented a logic flow chart showing one of the methods associated with the occupant safety aspects of the present invention. In this method, a driver and child or occupant ID routine is initiated at step 236. As discussed above in connection with FIG. 17, the occupant may include the family pet. The driver ID is checked at step 170 as described above. Next, the enable ignition step 174, RPM check step 176, and trip expiration step 178 proceed as normal. Thereafter, the disable ignition step 180 is performed when, for example, the car is parked in a normal manner. With continued low voltage supply, the system continues to run a check on any occupant passengers remaining in the car after step 180. This check is performed at step 238 as indicated. If a child or pet is detected by its personal RFID emitter device 222, the system proceeds to step 240 where the horn or lights are activated, or a distress signal is dispatched. If no occupant is detected, the system returns to the "do-nothing" or stand-by mode in step 182.

Figure 19:
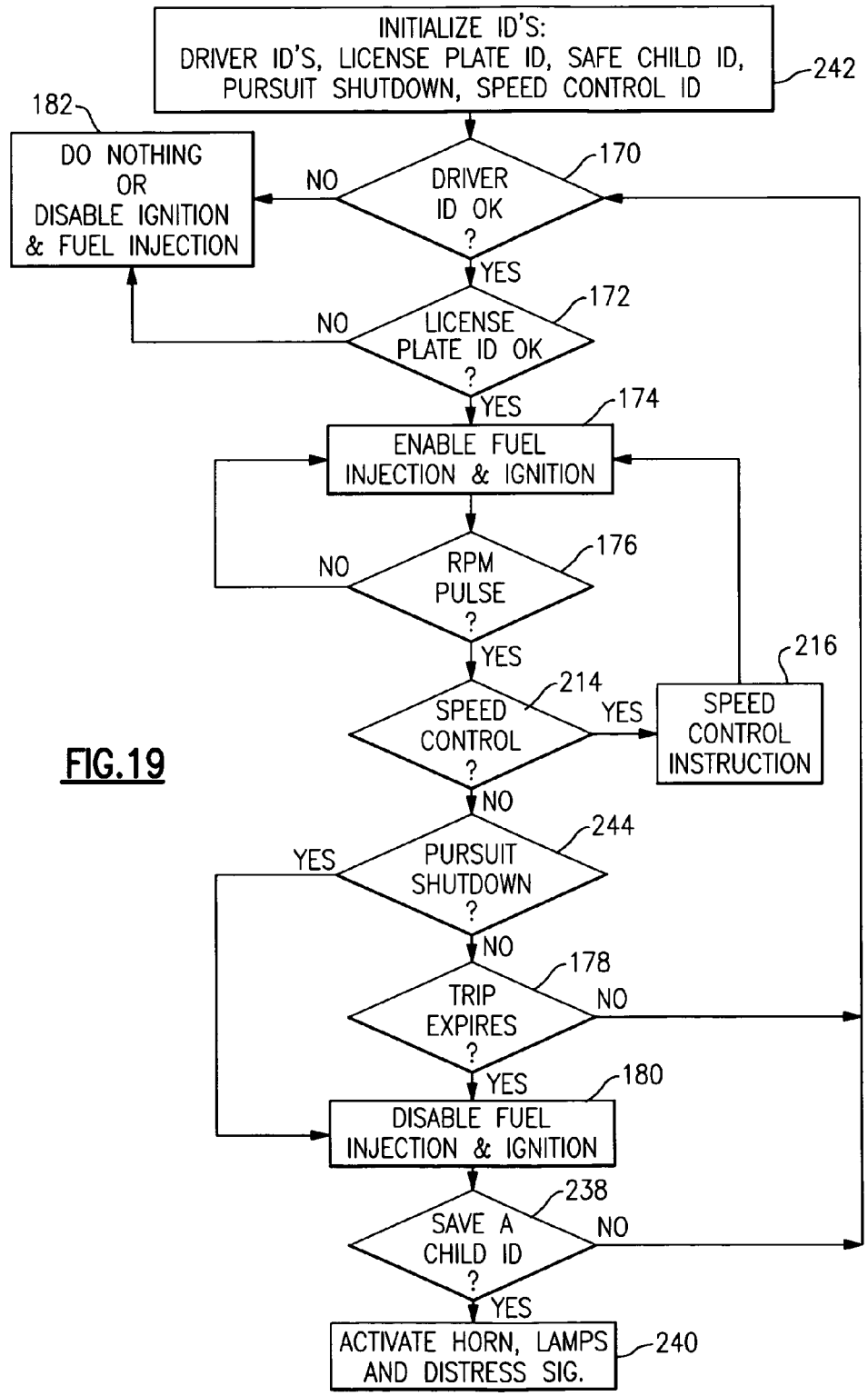
FIG. 19 is a multi-aspect logic flow chart showing several of the methods of the present invention integrated into a multi-method system according to the present invention.

FIG. 19 is a multi-aspect logic flow chart showing several of the methods of the present invention integrated into a multi-method system according to the present invention. Here a driver ID, license plate ID, child ID, pursuit shutdown protocol, and speed control ID routine is initiated at step 242. First the driver ID step 170 is performed as described above with reference to FIGS. 10 and 15, for example. Next at step 172, the license plate ID check is performed as described above in connection with FIG. 10, for example. The enable step 174 and the RPM check step 176 are also performed as previously indicated. In this particular embodiment of the present method, the speed control step 214 and speed control instruction step 216 are also performed as discussed in detail above in conjunction with FIG. 15. In this method, however, a pursuit shut-down step 244 is performed. According to this step, if the vehicle receives a shut-down signal from the any one of the police dispatcher 104 (FIGS. 1 and 2), the satellite 106 (FIG. 2), the hand-held device 108 (FIGS. 2 and 4), or the road-side RFID reader 184 (FIG. 11), the routine proceeds to the disable step 180 as illustrated. If no shut-down signal is received during the car trip, the routine proceeds to steps 178 and 180 without incident. As discussed above, the occupant safety step 238 is then performed. If the vehicle is clear of passengers, the routine proceeds to the "do-nothing" or stand-buy mode in step 182. On the other hand, if passengers remain in the vehicle after step 238, the horn and or the lights are activated, or a distress signal is dispatched in step 240.

While this invention has been described in detail with reference to certain preferred embodiments, it should be appreciated that the present invention is not limited to those precise embodiments. Rather, in view of the present disclosure which describes the current best mode for practicing the invention, many modifications and variations would present them-selves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A vehicle occupant identification and safety system, said system comprising:
   an RFID equipped vehicle for use by an operator, said vehicle including a computer system for controlling operating functions of said vehicle;
   an RFID emitter for use by a passenger of said vehicle, said RFID emitter in communication with said vehicle computer system when said passenger is in said vehicle; and
   processing logic associated with said computer system for determining when said operator of said vehicle has discontinued vehicle operation and for detecting a signal from said passenger RFID emitter so that said computer system may be activated to send a distress signal when said passenger has remained in said vehicle after a predetermined time from when said operator has discontinued vehicle operation.

2. A method for vehicle occupant identification and safety, said method comprising the steps of:
   providing an RFID equipped vehicle for use by an operator, said vehicle including a computer system for controlling operating functions of said vehicle;
   providing an RFID emitter for use by a passenger of said vehicle, said RFID emitter in communication with said vehicle computer system when said passenger is in said vehicle; and
   providing processing logic associated with said computer system for determining when said operator of said vehicle has discontinued vehicle operation and for detecting a signal from said passenger RFID emitter so that said computer system may be activated to send a distress signal when said passenger has remained in said vehicle after a predetermined time from when said operator has discontinued vehicle operation.

3. The vehicle occupant identification and safety system according to claim 1 wherein when said passenger has remained in said vehicle after said predetermined time from when said operator has discontinued vehicle operation, said computer system causes at least one vehicle light to flash on and off.

4. The vehicle occupant identification and safety system according to claim 1 wherein when said passenger has remained in said vehicle after said predetermined time from when said operator has discontinued vehicle operation, said computer system causes a vehicle horn to sound in a predetermined manner.

5. The vehicle occupant identification and safety system according to claim 1 wherein said distress signal includes directing a telephone call to a phone number associated with said operator.

6. The vehicle occupant identification and safety system according to claim 1 wherein said distress signal includes directing a telephone call to a security service.

7. The vehicle occupant identification and safety system according to claim 1 wherein said distress signal includes directing a telephone call to a police authority.

8. The vehicle occupant identification and safety system according to claim 1 further including a global positioning system (GPS) enabled to provide vehicle location information in association with said distress signal.

9. The vehicle occupant identification and safety system according to claim 1 wherein said discontinued vehicle operation by said operator includes placing said vehicle in a parked condition.

10. The vehicle occupant identification and safety system according to claim 1 wherein said distress signal is dispatched over a cellular telephone system.

11. The vehicle occupant identification and safety system according to claim 1 wherein said distress signal is dispatched over a satellite communications system.

12. The method according to claim 2 wherein when said passenger has remained in said vehicle after said predetermined time from when said operator has discontinued vehicle operation, said computer system causes at least one vehicle light to flash on and off.

13. The method according to claim 2 wherein when said passenger has remained in said vehicle after said predetermined time from when said operator has discontinued vehicle operation, said computer system causes a vehicle horn to sound in a predetermined manner.

14. The method according to claim 2 wherein said distress signal includes directing a telephone call to a phone number associated with said operator.

15. The method according to claim 2 wherein said distress signal includes directing a telephone call to a security service.

16. The method according to claim 2 wherein said distress signal includes directing a telephone call to a police authority.

17. The method according to claim 2 further including a global positioning system (GPS) enabled to provide vehicle location information in association with said distress signal.

18. The method according to claim 2 wherein said discontinued vehicle operation by said operator includes placing said vehicle in a parked condition.

19. The method according to claim 2 wherein said distress signal is dispatched over a cellular telephone system.

20. The method according to claim 2 wherein said distress signal is dispatched over a satellite communications system.

* * * * *